United States Patent
Giers

(10) Patent No.: US 6,275,752 B1
(45) Date of Patent: Aug. 14, 2001

(54) MICROPROCESSOR SYSTEM FOR AUTOMOBILE CONTROL SYSTEMS

(75) Inventor: Bernhard Giers, Frankfurt (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/423,226

(22) PCT Filed: Feb. 27, 1998

(86) PCT No.: PCT/EP98/01108

§ 371 Date: Mar. 10, 2000

§ 102(e) Date: Mar. 10, 2000

(87) PCT Pub. No.: WO98/53374

PCT Pub. Date: Nov. 26, 1998

(30) Foreign Application Priority Data

May 16, 1997 (DE) .............................. 197 20 618

(51) Int. Cl.[7] .................................................. G05B 9/03
(52) U.S. Cl. .................. 701/29; 701/76; 714/11
(58) Field of Search ............................... 701/76, 29, 31, 701/32, 33, 34, 35; 714/11, 12, 25

(56) References Cited

U.S. PATENT DOCUMENTS

| | | | |
|---|---|---|---|
| 4,672,530 | 6/1987 | Schuss ....................................... | 700/4 |
| 5,193,887 | * 3/1993 | Bleckmann et al. .................... | 303/92 |
| 5,485,379 | * 1/1996 | Kremer ................................... | 701/76 |
| 5,583,769 | 12/1996 | Saitoh ..................................... | 701/79 |

FOREIGN PATENT DOCUMENTS

| | | |
|---|---|---|
| 20 41 041 | 5/1972 | (DE) . |
| 32 26 195 | 2/1983 | (DE) . |
| 32 09 718 | 9/1983 | (DE) . |

(List continued on next page.)

OTHER PUBLICATIONS

Search Report of the German Patent Office for Application No. 197 20 618.2.

Smith, S.E.: "Triple Redundant Fault Tolerance: A Hardware–Implemented Approach". *ISA Transactions*, Jan. 1991, vol. 30, No. 4, pp. 87–95.

Gudea et al.: "Fault Tolerant Power Controller". *Proceedings of the Intersociety Energy Conversion Engineering Conference*, vol. 1, Aug. 1989, pp. 231–237.

Nikolaizik et al.: "Fehlertolerante Mikrocomputersysteme". *Verlag Technik GmgH*, Berlin,pp. 80–84. (Month, year are not available).

*Primary Examiner*—Tan Nguyen
(74) *Attorney, Agent, or Firm*—Rader, Fishman & Grauer PLLC

(57) ABSTRACT

A microprocessor system for safety-critical control operations includes three central units which are located jointly on one chip and execute the same program. Further, there is provision of read-only memories and random-access memories, input and output units, and comparators which check the output signals of the central units for correlation. The central units are interconnected by way of bus systems and bypasses which enable the central units to jointly read and execute the existing data and commands according to the same program. The memory capacity of the read-only and the random-access memories in total amounts to at least 200% compared to the memory required for a non-redundant system. The memory locations are distributed among the three systems, for example, in a ratio of 100:50:50. The central units are extended by redundant periphery components to provide two complete control signal circuits and are interconnected so that, in case of a failure, the faulty central unit can be identified by a majority decision, and a changeover to an emergency operation mode can take place.

6 Claims, 1 Drawing Sheet

FOREIGN PATENT DOCUMENTS

| | | |
|---|---|---|
| 32 25 455 | 1/1984 | (DE) . |
| 32 34 637 | 3/1984 | (DE) . |
| 34 33 778 | 3/1986 | (DE) . |
| 36 09 069 | 9/1986 | (DE) . |
| 01 97 315 | 10/1986 | (DE) . |
| 37 25 750 | 2/1989 | (DE) . |
| 40 02 389 | 11/1990 | (DE) . |
| 40 30 696 | 4/1992 | (DE) . |
| 41 24 987 | 1/1993 | (DE) . |
| 41 37 124 | 5/1993 | (DE) . |
| 43 41 082 | 6/1995 | (DE) . |
| 35 33 849 | 10/1995 | (DE) . |
| 44 39 060 | 5/1996 | (DE) . |
| 195 09 150 | 9/1996 | (DE) . |
| 195 29 434 | 2/1997 | (DE) . |
| 0 346 804 | 12/1989 | (EP) . |
| 0 399 308 | 11/1990 | (EP) . |

* cited by examiner

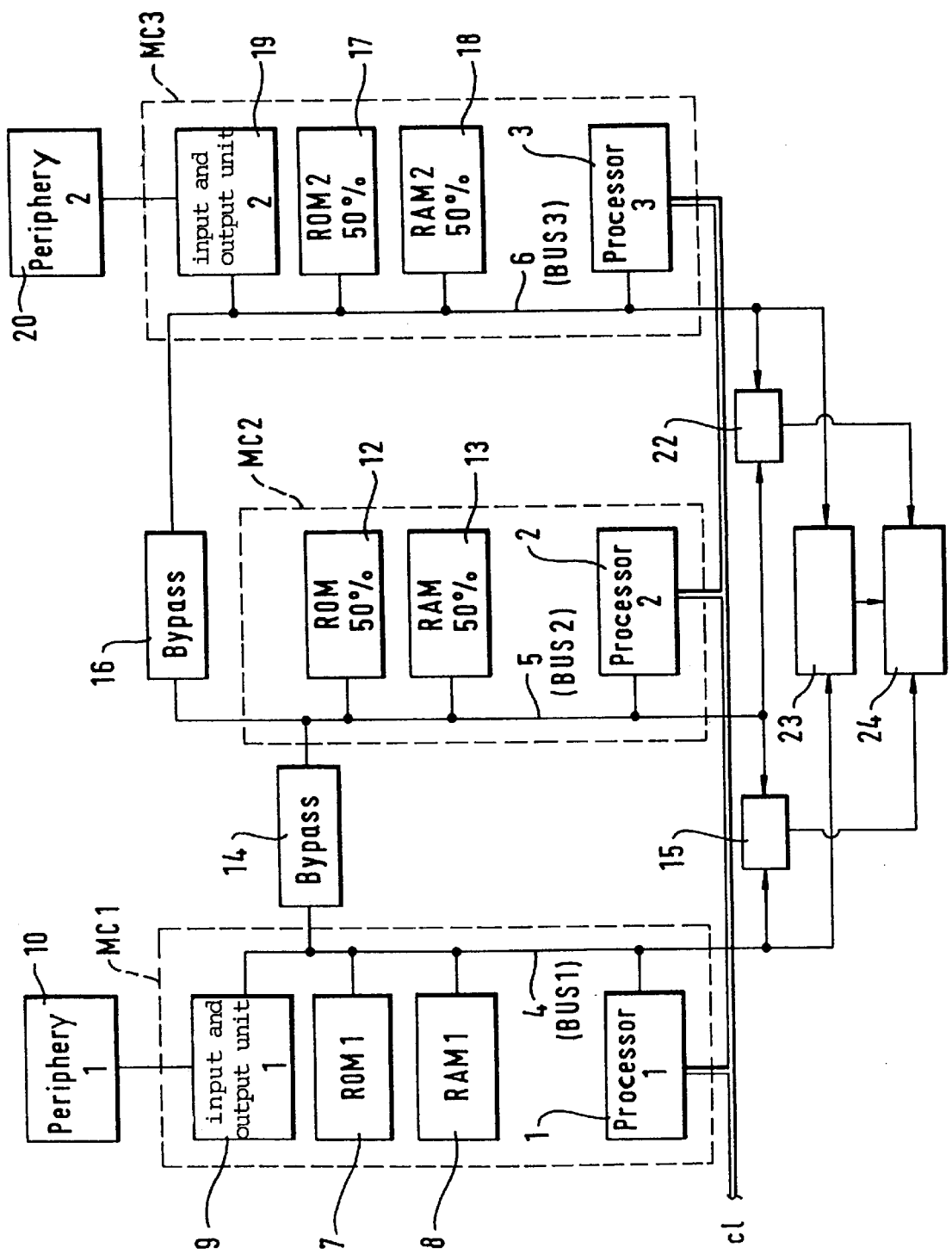

MICROPROCESSOR SYSTEM FOR AUTOMOBILE CONTROL SYSTEMS

TECHNICAL FIELD

The present invention relates to a microprocessor based control system and more particularly relates to microprocessing control systems intended for safety-critical vehicle control operations and includes redundant data processing.

BACKGROUND OF THE INVENTION

Safety-critical control operations of this type include, among others, control systems which intervene into the braking function of an automotive vehicle. These control systems are widely marketed and they are available in many different designs. Examples are anti-lock systems (ABS), traction slip control systems (TCS), driving stability control systems (DSC, ASMS), suspension control systems, etc. Failure of such control systems may jeopardize the driving stability of the vehicle. Therefore, operability of the systems is continuously monitored in order to deactivate the control when a malfunction occurs, or to switch it to a condition which offers maximum stability under the circumstances. Matters are even more critical for brake systems or automotive vehicle control systems where a switch-over to a mechanical or hydraulic system is not possible upon failure of the electronics. Among those systems are brake system concepts such as 'brake-by-wire' which are likely to gain in significance in the future. The braking function in such systems strongly depends on an intact electronics.

German patent No. 32 34 637 discloses one example of a microprocessor system for controlling and monitoring an anti-lock vehicle brake system. In this patent, the input data are sent in parallel to two identically programmed microcomputers where they are processed synchronically. The output signals and intermediate signals of the two microcomputers are compared for correlation. In the event of non-correlation of the signals, the control is disconnected.

According to another prior art system, the way the circuit described in German patent application No. 41 37 124 is designed, the input data are also sent in parallel to two microcomputers, only one of which executes the complete sophisticated signal processing operation, however. The main purpose of the second microcomputer is for monitoring the input signals and for producing time derivatives which can be processed further by way of simplified control algorithms and a simplified control philosophy. The simplified data processing is sufficient to generate signals which indicate the proper operation of the system by comparison with the signals processed in the more sophisticated microcomputer.

German patent application No. 43 41 082 discloses a microprocessor system which is provided especially for the control system of an anti-lock brake system. The system known from the art which can be incorporated on one single chip comprises two central units in which the input data are processed in parallel. The read-only and the random-access memories which are connected to the two central units have additional memory locations for test information, each comprising a generator to produce the test information. The output signals of one of the two central units are further processed to produce the control signals, while the other central unit, being a passive central unit, is only used to monitor the active central unit.

Finally, a system of the above-mentioned type is known from German patent application No. 195 29 434 wherein two synchronously operated central units are provided on one chip or on several chips which receive the same input information and execute the same program. The two central units are connected to the read-only and the random-access memories by way of separate bus systems as well as to input and output units. The bus systems are interconnected by drivers or bypasses, respectively, which enable both central units to jointly read and execute the data and commands available. The system renders it possible to economize memory locations. Only one of the two central units is connected (directly) to a complete read-only and random-access memory, while the memory capacity of the second processor is limited to memory locations for test data (parity monitoring) in connection with a test data generator. Access to all data is possible by way of the bypasses. This makes it possible for both central units to execute the complete program.

All above-mentioned systems are principally based on the comparison of redundantly processed data and the generation of an error signal when differences appear. The control can be deactivated upon the occurrence of an error or malfunction of a system. An emergency operation mode, i.e., continuing the control after the occurrence of the error, is in no case possible. Basically, such an emergency operation mode would be possible only by doubling the systems in connection with an identification and elimination of the source of errors.

An object of the present invention is to configure a microprocessor system of the above-mentioned type with at most little additional effort so that an emergency operation mode becomes possible upon the occurrence of an error.

The system of the present invention includes at least three central units with at least the double memory capacity compared to the memory capacity for a non-redundant system, in that the central units are extended by redundant periphery units to provide at least two complete control signal circuits and are interconnected in such a manner that, upon failure of a central unit and/or associated components or upon the occurrence of an error in one of the data processing systems, the faulty central unit can be identified by a majority decision in an identification unit, and a change-over to an emergency operation mode is effected where at least one control signal circuit with a full memory capacity is available and an output of output signals or control signals as a function of the faulty central unit is prevented.

According to the present invention, redundancy, i.e. maintaining the redundant data processing, is refrained from in determined, rare cases in favor of a particularly simple controller design, because the occurrence of another error during a short emergency operation period is extremely unlikely and because disconnection of the control is out of the question, or would increase the safety risk. Instead, the effects of errors are eliminated and the control and/or regulation is continued on the basis of the faultless systems and signals upon the occurrence of errors after the identification of the error source or the intact systems.

In a preferred aspect of the present invention, there is provision of three central units with each one bus system, and the memory locations in the three central units are distributed such that upon failure of one central unit, the other two central units have at disposal at least the full read-only and random-access memory capacity, and all central units are connected to the memory locations in the write and read directions and to all input and output wits by way of the bypasses.

It has been found to be particularly expedient that one central unit has the full (100%) memory capacity and the other two have respectively at least 50% of the read-only and random-access memory capacity required for a non-redundant system.

Thus, the present invention builds upon the above-mentioned system known from German patent application No. 195 29 434 which is principally composed of one complete and one incomplete data processing system, and extends this system by an additional complete data processing system with the associated periphery units. Two complete control signal circuits or control signal processing systems are achieved which are interconnected to provide a total system that permits an emergency operation mode and ensures maintaining the control even upon failure of a processor and identification of the error source. This means that the interconnection of the individual systems or components according to the present invention permits continuing the control and regulation upon failure of one processor by utilizing the intact circuits.

The total number of memory locations needed which generally determines the price of the microprocessor system is merely doubled, compared to processing in a non-redundant system, and the distribution and allocation of the memory locations to the individual processors is variable within wide limits. It must be ensured that each individual processor or each individual processor unit can execute the full program.

The configuration of the microprocessor system according to the present invention permits accommodating all or the main components, especially all central units, memories, comparators and bypasses as well as, if necessary, the input and output units, on one single chip.

The three central units, along with the memories, the input and output units and the periphery units, including the voltage supply, etc., form two complete and one incomplete data processing systems in total. The memory locations required for a complete program run are distributed among two data processing systems. Favorably, each of the data processing systems comprises at least one central unit, one bus system, as well as read-only and random-access memories, and the memory locations are distributed among the individual data processing systems so that, upon the occurrence of an error and change-over to the emergency operation mode, the intact systems have a sufficient number of memory locations for the complete data processing and execute the complete program.

In another aspect of the present invention, the system is configured for a plurality of, or a combination of, automotive vehicle control systems such as brake-by-wire, ABS, TCS, ASMS, etc., and the emergency operation mode either covers maintaining the operation of all control systems, or only maintaining selected control functions, for example, functions which are especially critical in terms of safety.

BRIEF DESCRIPTION OF THE DRAWINGS

FIG. 1 is a schematically simplified view of the basic components of a microprocessor system of the present invention.

DETAILED DESCRIPTION OF THE PREFERRED EMBODIMENTS

The drawing relates to a single-chip microcomputer system comprising three synchronously operated processors or central units 1, 2, 3 which are also referred to as computer cores or, due to their function, as processor cores. Associated with each processor is a bus system 4, 5, 6. The central units 1, 2, 3 are connected to a synchronous clock system cl (common clock) of a redundant design.

The central unit 1 or the processor core 1 is supplemented by a read-only memory 7 (ROM 1), a random-access memory 8 (RAM 1), and an input and output unit 9 to achieve a complete data-processing system or microcomputer MC1. The necessary periphery components (periphery 1) are represented by an external block 10. Among the periphery components is the voltage supply system, the delivery of the input signals (for example, the sensor signals in an automotive vehicle control system), and the actuator or valve actuation control, etc., by means of the output data or signals of the data processing systems.

A second, incomplete data processing system or microcomputer MC2 in which the central unit 2 is accommodated comprises only memory locations for 50% of the data required for a non-redundant system in the embodiment shown. Read-only memory locations 12 and memory locations 13 for the data in the read-only section are represented in the interior of the microcomputer MC2.

BUS 1 (bus system 4) and BUS 2 (bus system 5) are cross-connected by way of a bypass 14. Bypass 14 enables the central unit 1 to read the data stored in the memory locations 12, 13 and permits data flow from the memories 7, 8 and the processor core 1 of the microcomputer MC1 to the microcomputer MC2, especially to the central unit 2. This ensures a redundant execution of the complete data processing program by both central units 1, 2. Still further details about the design and the mode of operation of microprocessor systems of this type can be seen in the above-mentioned German patent application No. 195 29 434.

The data processing results of both systems MC1, MC2 or processors 1, 2 are monitored for correlation by means of a comparator 15, as has been explained in the above-mentioned application. The output signals of both processors are compared directly by way of a hardware comparator 15.

A general feature of the microprocessor system of the present invention and the embodiment shown in the drawing is that the above-described system disclosed in German patent application No. 195 29 434 is extended by another data processing system, i.e., by a microcomputer MC3 which also cooperates with the incomplete microcomputer MC2 and with the microcomputer MC1. Part of the functions of the additional microcomputer system (MC3), that is, storing of part of the data, for example 50% of the read-only and the random-access data, however, is performed by the second microcomputer system MC2 and, if necessary, also by the first system MC1 because the entire system, for ensuring the redundance function, requires only the double memory capacity, compared to a non-redundant system which executes the same program. The memory capacity must be distributed among the three data processing systems MC1, MC2, MC3 so that upon failure of one system, the remaining systems offer a sufficient memory location, i.e., at least 100%. In a preferred embodiment, the microprocessor system MC1 is equipped with 100%, and each of the two microcomputer systems MC2 and MC3 is equipped with 50% of the memory locations required for a non-redundant system.

The third microcomputer system MC3 is connected to the (incomplete) microcomputer MC2 also by a bypass 16. Bypass 16 has the same function as bypass 14, which has already been described in detail, and therefore enables also the central units 2 and 3 to redundantly process all input data.

The microprocessor system MC3 includes a read-only memory 17 (ROM 2), a random-access memory 18 (RAM 2), an input and output unit 19 and periphery components 20 (periphery 2). MC3 is a complete microcomputer in the embodiment shown, for which, however, a reduced memory capacity is sufficient, as has been explained hereinabove. The capacity of the memories in MC2 and MC3 together amounts to (at least) 100%.

Data flow in both directions from BUS 1 (bus system 4) to BUS 3 (bus system 6) is possible by way of bypasses 14, 16. In order to further increase the fail safety, it might be expedient to establish a direct connection between the two bus systems 4, 6 (BUS 1 and BUS 3) by means of an additional bypass (which is not shown).

The microcomputer MC3 has the same design and the same components as microcomputer MC1. Consequently, the microprocessor system according to the present invention includes two times the input and output units 9, 19 and the periphery components 10, 20 comprising the voltage supply, the sensor signal input and the actuator control.

The output signals or data processing results of the third microcomputer MC3 are checked for correlation with the results or output signals of the microcomputer MC2 or the central unit 2 by way of a comparator 22 and, equally, for correlation with the results of MC1 or the central unit 1 by way of the comparator 23. This renders possible not only detection of the fault, but also an identification of the system where the fault is located. In an identification stage 24 which is preferably redundant and to which the output signals of the comparators 15, 22, 23 are sent, the source of errors is identified by a majority decision, and the system is subsequently switched over to an emergency operation mode. This means that the output of control signals as a function of faulty data processing results is prevented and switch-over to the intact system is effected instead.

The system of the present invention can be achieved with comparatively low effort in manufacture. In comparison to the prior art system which does not permit an emergency operation, it is principally sufficient to add a processor core and to double the memory capacity. A classical solution with an emergency operation mode would require at least three times the expenditure in memories.

When the memory capacity is increased by some memory locations compared to the minimum value of 200%, for example, by memory locations for one parity bit each, error localization in the memory range becomes possible also by a hardware majority decision. When the minimum rating of the memory capacity of 200% is chosen, the localization of errors can be achieved by producing sums of digits by way of memory blocks, or by other software technology measures.

The reduction of the memory capacity achieved by the design of the present invention compared to known systems is a major advantage because the costs of the entire system are determined to a major extent by the size of the working memories (read-only and random-access memories).

There is minimum expenditure in the comparators 15, 22, 23 which perform an identification monitoring. The exchange of signals between the individual microcomputers by way of the bypasses necessitates no appreciable effort. Software for a seeming single-processor system is realized in terms of programming. No software structures are required which achieve an exchange of signals between the microcomputers or check signals for equality or similarity.

It is principally also possible to have the fail-free circuit carry out the take-over of the input information and the signal output upon the occurrence of an internal computer error, or to instruct the fail-free circuit to do so. The result is further simplifications and system functions.

What is claimed is:

1. Microprocessor system for automotive vehicle control systems with redundant data processing of the type used for safety-critical control operations, comprising:

a first, second, and third central unit, wherein each central unit includes a respectively associated bus, a respectively associated read-only and random access memory, and a respectively associated input and output unit, comparators coupled between the buses of the first, second, and third central units for checking the data processed by the first, second and third central units for correlation, a fourth bus system common to said first, second and third central units, wherein said first, second, and third central units execute the same program, a first bypass coupled between the buses of the first and second central units, a second bypass coupled between the buses of the second and third central units, said first and second bypasses enabling the first, second and third central units to jointly read data and execute commands, wherein said first, second and third central units along with their respectively associated read-only and random access memory, their input and output units, and their periphery units, form two complete and one incomplete data processing systems, wherein said two complete data processing systems further include redundant periphery units for providing two complete control signal circuits, wherein the capacity of the read-only and random access memory of the first, second and third central units combined, is twice the capacity of that needed if no redundancy was employed, and wherein upon the failure of one of said first, second, or third central units, the faulty central unit is identified by majority decision, and wherein one of said two complete data processing systems is selected to operate the vehicle control system under an emergency mode.

2. Microprocessor system as claimed in 1, wherein the read-only and random access memory locations in each of the first, second, and third central units are distributed such that upon the occurrence of an error in any one of the central units, the remaining two central units in total have available at least the full read-only and random-access memory capacity, and wherein all central units are connected to all of the read-only and random access memory locations in the write and read directions and to all input and output units by way of the first and second bypasses.

3. Microprocessor system as claimed in claim 2, wherein one of said first, second, and third central unit has the full read-only and random-access memory capacity required for a non-redundant system and the remaining two central units each have at least 50% of the read-only and random-access memory capacity required for a non-redundant system.

4. Microprocessor system as claimed in claim 1, wherein the buses of the first, second, and third central units are sent to comparators.

5. Microprocessor system as claimed in claim 1, wherein the first, second and third central units and comparators reside on one integrated chip.

6. Microprocessor system as claimed in claim 1, wherein the system is configured for controlling a plurality of automotive vehicle systems selected from the set of brake-by-wire, ABS, TCS, ASMS.

* * * * *